(12) United States Patent
Scott et al.

(10) Patent No.: US 7,827,052 B2
(45) Date of Patent: Nov. 2, 2010

(54) SYSTEMS AND METHODS FOR REPUTATION MANAGEMENT

(75) Inventors: James Kevin Scott, New York, NY (US); Jeff C. Reynar, New York, NY (US); Jeremy A. Hylton, Easton, PA (US); Kushal B. Dave, New York, NY (US)

(73) Assignee: Google Inc., Mountain View, CA (US)

( * ) Notice: Subject to any disclaimer, the term of this patent is extended or adjusted under 35 U.S.C. 154(b) by 1038 days.

(21) Appl. No.: 11/241,693

(22) Filed: Sep. 30, 2005

(65) Prior Publication Data

US 2007/0078699 A1    Apr. 5, 2007

(51) Int. Cl.
*G06F 9/44* (2006.01)
(52) U.S. Cl. .......................................................... 705/7
(58) Field of Classification Search ........................ None
See application file for complete search history.

(56) References Cited

U.S. PATENT DOCUMENTS

| | | | |
|---|---|---|---|
| 5,939,278 A | 8/1999 | Boon et al. | 435/7.23 |
| 6,064,980 A | 5/2000 | Jacobi et al. | 705/26 |
| 6,236,990 B1 | 5/2001 | Geller | 707/5 |
| 6,260,064 B1 | 7/2001 | Kurzrok | 709/224 |
| 6,285,999 B1 | 9/2001 | Page | 707/5 |
| 6,598,026 B1 * | 7/2003 | Ojha et al. | 705/26 |
| 6,718,324 B2 * | 4/2004 | Edlund et al. | 707/5 |
| 6,807,566 B1 * | 10/2004 | Bates et al. | 709/206 |
| 6,892,178 B1 * | 5/2005 | Zacharia | 705/10 |
| 6,892,179 B1 * | 5/2005 | Zacharia | 705/10 |
| 6,912,505 B2 | 6/2005 | Linden et al. | 705/14 |
| 6,963,848 B1 * | 11/2005 | Brinkerhoff | 705/10 |
| 7,013,303 B2 * | 3/2006 | Faybishenko et al. | 707/10 |
| 7,039,631 B1 * | 5/2006 | Finger, II | 707/3 |
| 7,246,110 B1 | 7/2007 | Musgrove et al. | 707/3 |
| 7,302,429 B1 | 11/2007 | Wanker | 707/7 |
| 7,343,374 B2 * | 3/2008 | Berkhin | 707/5 |
| 7,406,436 B1 * | 7/2008 | Reisman | 705/10 |
| 7,428,496 B1 * | 9/2008 | Keller et al. | 705/10 |

(Continued)

OTHER PUBLICATIONS

Malaga RA (2001). Web-Based Reputation Management Systems: Problems and Suggested Solutions. Electronic Commerce Research. 1:403-417.*

(Continued)

*Primary Examiner*—Romain Jeanty
*Assistant Examiner*—Brett Feeney
(74) *Attorney, Agent, or Firm*—Morgan, Lewis & Bockius LLP

(57) ABSTRACT

A reputation management system, method and computer readable storage medium assigns reputation scores to various types of entities including, but not limited to people, products, advertisers and merchants. A reputation function is based on a directed graph including the reviewers and the reviews. The nodes in the graph represent the reviewers and the reviews and the links in the graph represent the ratings. The reputation function is iteratively solved until a convergence condition is met. Prior to convergence, when a stability condition is met, the reputation function is modified so as to remove portions of the function corresponding to nodes with negative reputations. Upon convergence, reputation values for at least the reviewers and reviews corresponding to nodes that have not been removed from the reputation function are generated.

25 Claims, 6 Drawing Sheets

U.S. PATENT DOCUMENTS

| | | | |
|---|---|---|---|
| 7,433,832 B1* | 10/2008 | Bezos et al. | 705/26 |
| 7,461,051 B2* | 12/2008 | Lavine | 1/1 |
| 7,467,206 B2* | 12/2008 | Moore et al. | 709/225 |
| 7,493,320 B2* | 2/2009 | Canright et al. | 707/5 |
| 7,519,562 B1 | 4/2009 | Vander Mey et al. | 705/500 |
| 7,620,651 B2* | 11/2009 | Chea et al. | 707/102 |
| 2002/0046203 A1* | 4/2002 | Siegel et al. | 707/1 |
| 2002/0165905 A1 | 11/2002 | Wilson | 709/203 |
| 2002/0193066 A1* | 12/2002 | Connelly | 455/2.01 |
| 2004/0030525 A1* | 2/2004 | Robinson et al. | 702/127 |
| 2004/0117340 A1 | 6/2004 | Blitzer | 707/1 |
| 2004/0205065 A1 | 10/2004 | Petras et al. | 707/5 |
| 2004/0225577 A1* | 11/2004 | Robinson | 705/26 |
| 2004/0225672 A1 | 11/2004 | Landers et al. | 707/102 |
| 2005/0027685 A1* | 2/2005 | Kamvar et al. | 707/2 |
| 2005/0034071 A1* | 2/2005 | Musgrove et al. | 715/530 |
| 2005/0065811 A1 | 3/2005 | Chu et al. | 705/1 |
| 2005/0091038 A1* | 4/2005 | Yi et al. | 704/10 |
| 2005/0097188 A1 | 5/2005 | Fish | 709/217 |
| 2005/0131918 A1 | 6/2005 | Hillis et al. | 707/100 |
| 2005/0137939 A1 | 6/2005 | Calabria et al. | 705/26 |
| 2005/0216295 A1 | 9/2005 | Abrahamsohn | 705/1 |
| 2006/0064343 A1* | 3/2006 | Burke et al. | 705/10 |
| 2006/0129446 A1 | 6/2006 | Ruhl et al. | 705/10 |
| 2006/0143158 A1* | 6/2006 | Ruhl et al. | 707/3 |
| 2006/0277290 A1 | 12/2006 | Shank | 709/223 |
| 2006/0282762 A1 | 12/2006 | Diamond et al. | 715/511 |
| 2007/0033092 A1* | 2/2007 | Iams | 705/10 |
| 2007/0038620 A1* | 2/2007 | Ka et al. | 707/5 |
| 2007/0078669 A1* | 4/2007 | Dave et al. | 705/1 |
| 2007/0078670 A1* | 4/2007 | Dave et al. | 705/1 |
| 2007/0078699 A1* | 4/2007 | Scott et al. | 705/10 |
| 2007/0078845 A1* | 4/2007 | Scott et al. | 707/5 |
| 2007/0078851 A1 | 4/2007 | Grell et al. | 707/7 |
| 2007/0208613 A1* | 9/2007 | Backer | 705/10 |
| 2007/0294127 A1 | 12/2007 | Zivov | 705/10 |
| 2008/0015925 A1* | 1/2008 | Sundaresan | 705/10 |
| 2008/0120166 A1* | 5/2008 | Fernandez et al. | 705/10 |
| 2008/0256040 A1* | 10/2008 | Sundaresan et al. | 707/3 |

OTHER PUBLICATIONS

Mui Lik, Halberstadt A and Mohtashemi (2003). Evaluating Reputation in Multi-agents Systems. LNAI: 2631 123-137.*

Ding CHQ, Zha H, He X, Husbands P, and Simon HD (2003). Link Analysis: Hubs and Authorities on the World Wide Web. LBNL Tech Report 47847. 1-12.*

Lempel R (2005). Rank-Stability and Rank-Similarity of Link-Based Web Ranking Algorithms in Authority-Connected Graphs. Information Retrieval 8: 245-264.*

Zhang L, Ma FY, Ye YM and Chen JG (2002). CALA A Web Analysis Algorithm Combined with Content Correlation Analysis Method. J. Comput. Sci. & Technol. vol.18, No. 1, pp. 114-117.*

Donovan JO, Evrim V, Smyth B and McLeod d (2003). Personalizing Trust in Online Auctions. ios Press. 1-12.*

Resnick P, Zeckhauser R, Friedman E and Kuwabara K (2000). Reputation Systems. Association for Computing Machinery. 43(12): 45-48.*

Riggs T (2001). An Algorithm for Automated Rating of Reviewers. JCDL Jun. 24-28. 381-387.*

Haveliwala TH and Kamvar SD (2003). The Second Eigenvalue of the Google Matrix. Stanford University. pp. 1-8.*

Haveliwala TH (2003). Topic-Sensitive PageRank: A Context-Sensitive Ranking Algorithm for Web Search. IEEE Transactions on Knowledge and Data Engineering. 15(4): 784-796.*

Wang Y and DeWitt D (2004). Computing PageRank in a Distributed Internet Search System. Proceedings of the 30th VLDB Conference. 420-431.*

Zacharia G, Moukas A and Maes P (2000). Collaborative reputation mechanisms for electronic marketplaces. Decision Support Systems. 371-388.*

Ding CHQ, Zha H, He X, Husbands P and Simon HD (2004). Link Analysis: Hubs and Authorities on the WorldWideWeb. SIAM Review. 46(2): 1-13.*

Kleinberg JM (1998). Authoritative Sources in a Hyperlinked Environment. ACM-SIAM Symposium on Discrete Algorithms. 1-34.*

Langville AN and Meyer CD (2004). Deeper Inside PageRank. Internet Mathematics. 1(3): 335-380.*

Abonyi J and Abraham A (2005). Computational Intelligence in Data mining. Informatica. 29(1): 1-128.*

Gibson DA (2002). Communities and Reputation on the Web. Doctoral dissertation, UC Berkeley. 1-117.*

Langville AN and Meyer CD (2004). A survey of Eigenvector Methods for Web Information Retrieval. 1-26.*

Borodin A, Roberts GO, Rosenthal JS and Tsaparas P (2005). Link Analysis Ranking: Algorithms, Theory,and Experiments. ACM Transactions on Internet Technology. 5(1): 231-297.*

Massa P and Hayes C (2004). Page-reRank: using trusted links to re-rank authority. Proceedings of the 2005 IEEE/WIC/ACM International Conference on Web Intelligence. p. 1-7.*

Massa and Avesani (2004). Trust-Aware Collaborative Filtering for Recommender Systems. LNCS 3290, pp. 492-508.*

Mendelzon AO and Rafiei D (2000). What do the Neighbours Think? ComputingWeb Page Reputations. Bulletin of the IEEE Computer Society Technical Committee on Data Engineering. 1-8.*

Furner J. On Recommending (2002). Journal of the American Society for Information Science and Technology. 1-27.*

Berkhin P (2005). A Survey on PageRank Computing. Internet Mathematics vol. 2, No. 1: 73-120.*

Kushal, D.B., et al., "Mining the Peanut Gallery: Opinion Extraction and Semantic Classification of Product Reviews", *WWW 2003*, May 20-24, 2003, Budapest, Hungary.

Hu, M., et al., "Mining Opinion Features in Customer Reviews", *Proceedings of 19th National Conf. on Artificial Intelligence (AAAI-2004)*, Jul. 2004, San Jose, CA.

Nigam, K., et al., "Towards a Robust Metric of Opinion", *Proceedings of 19th National Conf. on Artificial Intelligence (AAAI-2004)*, Jul. 2004, San Jose, CA.

Yi, J., et al., "Sentiment Analyzer: Extracting Sentiments about a Given Topic using Natural Language Processing Techniques", *Proceedings of the 3rd IEEE Int'l Conf. on Data Mining*, 2003.

Hu, M., et al., "Mining and Summarizing Customer Reviews", *KDD '04*, Aug. 22-25, 2004, Seattle, WA.

Guha, R., et al., "Propagation of Trust and Distrust," *WWW 2004*, May 17-22, 2004, New York, NY.

Kamvar, S.D., et al., "The EigenTrust Algorithm for Reputation Management in P2P Networks," *WWW 2003*, May 20-24, 2003, Budapest, Hungary.

Richardson, M., et al., "Trust Management for the Semantic Web," *Proceedings of the 2nd Int'l Semantic Web Conf.*, 2003, Sanibel Island, FL.

Church et al., "Inverse document frequency (IDF): a measure of deviations from Poisson," AT&T Bell Laboratories, 1995, pp. 121-130.

Google: Google Gram - Google launches Froogle, M2 Presswire, Coventry, May 22, 2005, 1 pg.

International Search Report for PCT/US2006/038552 mailed Aug. 31, 2007.

Kurchak, Notes application strategies: document rating, IBM, Apr. 5, 2004, 16 pgs.

Palme, "How to integrate the Select rating service with other Web services?", Publisher:www.sztaki.hu, May 2001, pp. A-1, A-2, B-1, B-2 http://web.archive.org/web/20010502234530/www.sztaki.hu/SELECT/integration.html.

ProQuest, "My Research," 2008, 1 pg.

Richardson et al., Trust management for the Semantic Web, Proceedings of the 2nd International Semantic Web Conference, 2003, 17 pgs.

* cited by examiner

500

US 7,827,052 B2

SYSTEMS AND METHODS FOR REPUTATION MANAGEMENT

TECHNICAL FIELD

The disclosed embodiments relate generally to reputation management in a computer network based system. More particularly, the disclosed embodiments are directed to reputation management among a set of various type of raters and reviews.

BACKGROUND

Among some web sites which allow visitors to view various items (e.g., products), the visitors are presented reviews of the items along with descriptions of the items. In some instances reviews of item providers (e.g., merchants) may also be available for examination. In the absence of malicious reviewers, a cumulative rating for an item (or item provider) by a large number of reviewers tends to increase the accuracy of the cumulative review.

SUMMARY

According to some embodiments of the invention, a method for determining reputation values includes iteratively solving a reputation function for a set of reputation values with respect to a set of linked nodes, where the nodes represent reviewers and reviews. The function solving process continues until a convergence condition is satisfied. The method includes determining whether a stability condition is satisfied. The reputation function is modified so as to remove nodes with negative reputation when the stability condition is satisfied.

BRIEF DESCRIPTION OF THE DRAWINGS

The aforementioned embodiments of the invention as well as additional embodiments will be more clearly understood as a result of the following detailed description of the invention when taken in conjunction with the drawings. Like reference numerals refer to corresponding parts throughout the several views of the drawings.

DESCRIPTION OF EMBODIMENTS

Generally, reviews are provided by individuals of varying levels of trustworthiness and reviewing competency. Embodiments of the present invention provide cumulative product or merchant ratings that take into account the reputation of the reviewers.

According to some embodiments, a reputation management system assigns reputation scores to various types of entities including, but not limited to people, reviews, advertisers and merchants. In some embodiments, raters who write reviews which are rated highly by a number of other reviewers are generally entitled to higher reputations than those raters who write reviews which are less highly rated. A reputation function may be created based on a directed graph including the raters and the reviews. The nodes in the graph represent the raters and the reviews and the links in the graph represent the ratings for the reviews. Raters may also be rated. Since in some embodiments, ratings may be negative, negative links must be accounted for in the reputation function. The reputation function is iteratively solved until a convergence condition is met. According to some embodiments, prior to convergence, when a stability condition is met, nodes with negative reputations are removed from the reputation function. According to some embodiments, these removed nodes are given a reputation value of zero. In some embodiments, the stability condition is examined after a plurality of iterations.

Figure 1:
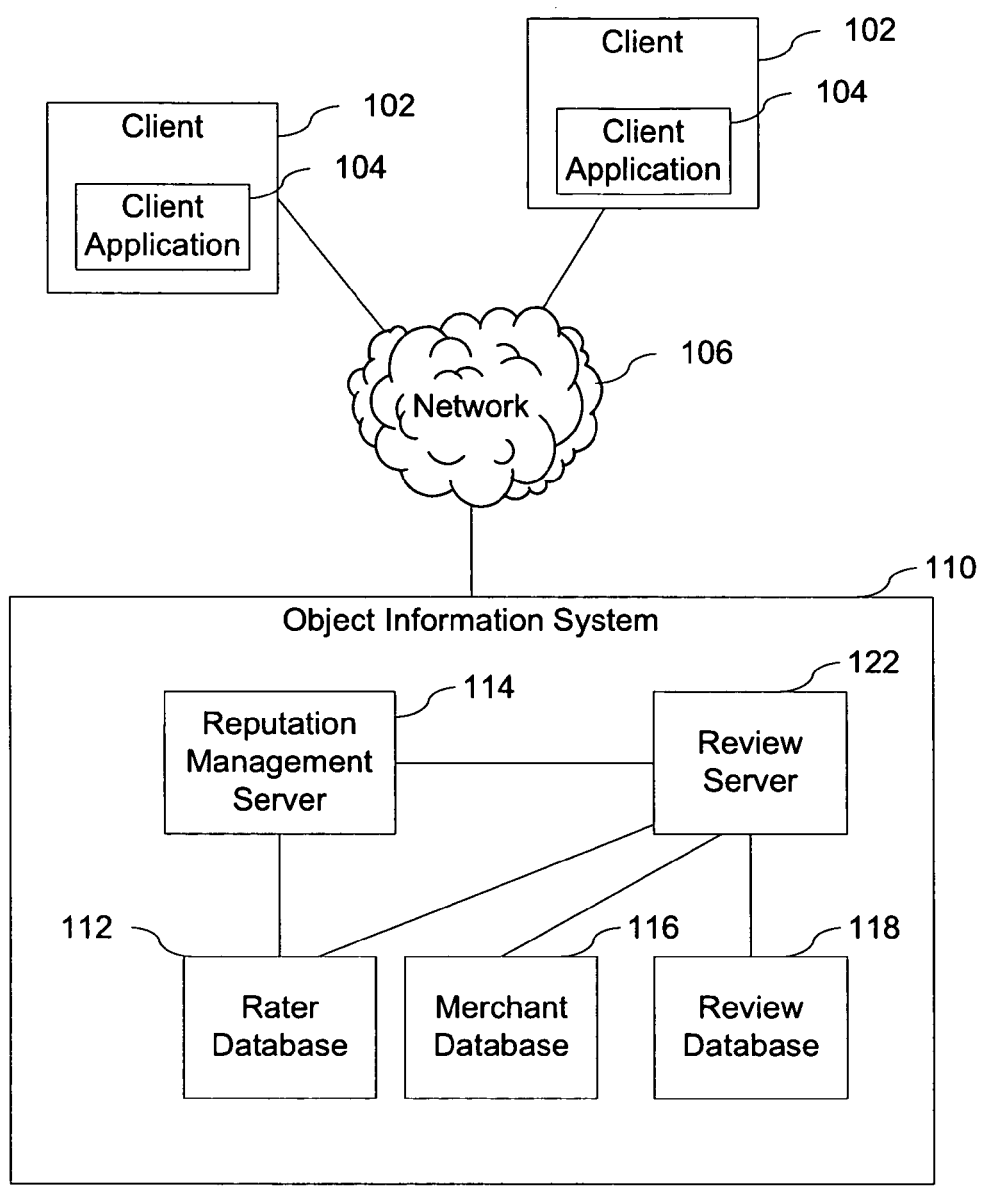
FIG. 1 illustrates an environment in which embodiments of the invention may operate.

FIG. 1 is a block diagram of a system 100 in which some embodiments of the invention operate and shows various functional components which will be referred to in the detailed discussion which follows. The system 100 may include one or more clients 102 that access information in an object information system 110. Each client 102 has a client application 104. The clients 102 can be any of a number of devices (e.g., computer, internet kiosk, personal digital assistant, cell phone, gaming device, desktop computer, laptop computer) that enable the user to interact with the other components as described below. The clients 102 are connected to a communications network 106, such as the Internet. The communications network 106 connects the clients 102 to the object information system 110. Object information system 110 includes a rater database 112, a reputation manager 114, a merchant database 116, a review database 118 and a review server 122. The client application 104 may be an application program (e.g., a web browser) which provides an interface with which to communicate with the object information system 110.

The rater database 112 includes information about the various raters (e.g., email address, screen name, and optionally an internal identifier for each rater, where the internal identifier is used to link to all reviews authored by each rater). "Raters" are persons who submit reviews and ratings for products, services, merchants or the like. Raters may also rate the reviews of other raters. The reputation manager 114 determines and stores values representing the reputations of various entities by solving a reputation function as described below. The merchant database 116 includes information about various merchants offering products and services for which reviews may be provided. The review database 118 includes reviews written about particular products or services. It may also include reviews for merchants, restaurants, organizations (for example, charities), movies, brands, fashion, etc. The review server 122 provides access to the reviews in the review database 118, and also handles the addition of newly received reviews to the review database 118. For example, the review server 122 may respond to a request relating to a specific product by obtaining the product information, merchant information, a selection of reviews on that product and/or merchant, and cumulative ratings for the product, for display to the user.

In some embodiments, fewer and/or additional modules, functions or databases are included in the system 100. The elements shown in FIG. 1 as being part of the system 100 represent functions performed in an exemplary embodiment. And although it shows discrete blocks, FIG. 1 is intended more as a functional description of some embodiments of the invention rather than a structural mapping of the functional elements. One of ordinary skill in the art will recognize that an actual implementation might have the functional elements grouped or split among various components. For example, the merchant database 116 may be implemented using one or more servers whose primary function is to store merchant information.

Figures 2, 3:
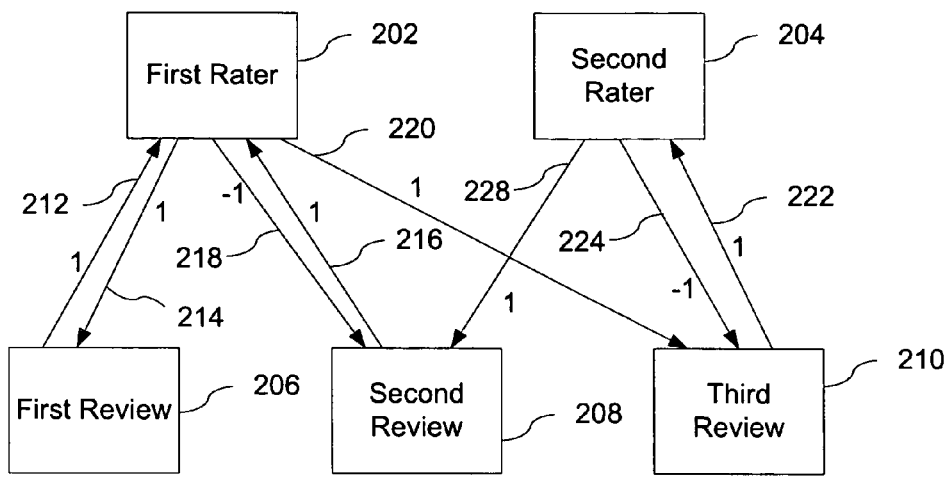
FIG. 2 illustrates an exemplary rating diagram among raters and reviews with weighted links according to some embodiments of the invention.
FIG. 3 is a matrix corresponding to the rating diagram of FIG. 2 according to some embodiments of the invention.

According to some embodiments of the invention, one aspect of the system 100 provides for receiving, processing and presenting reviews from raters. Raters provide reviews for rateables (e.g., things, people and organizations or groups of people that can be rated) and ratings. Rateables may include products, services, merchants, reviews and raters, or any subset or superset of these entities. A reputation graph is constructed using the raters, the ratings and the reviews. In the reputation graph, entities, including raters and rateables, are represented by nodes. Ratings, which can be both positive and negative, are represented by links. FIG. 2 illustrates an exemplary reputation graph according to some embodiments of the invention and includes a first rater 202, a second rater 204, and three reviews 206, 208, 210. For simplicity purposes, only two raters and three reviews are discussed, but one of ordinary skill in the art will readily realize that the techniques described herein readily scale to any number of reviews and raters.

Referring to FIG. 2, the first rater 202 is the author of (i.e., is attributed to having written) the first and second reviews 206, 208. A back link is provided from a review back to the rater who authored the review, while a forward link from a rater to a review is provided when a rater has provided a review for a rateable. According to some embodiments, although each review may have one or more raters with a forward link to it, each review may only have one backward link, i.e., the backward link indicating the author of the review. Accordingly a back link 212 from the first review 206 to the first rater 202 indicates that the first review 206 was attributed to the first rater 202. It has a value of "1" indicating a positive link toward the author. In some embodiments, the value of the back link to an author is provided with a positive indicator. In some embodiments, this positive indicator is a value indicating a high positive rating value. As mentioned earlier, rating values can range from negative to positive. A value in the middle represents a "neutral" rating. In some embodiments, the range of ratings values extends from –R (representing a low rating) to +R (representing a high rating) where R is a positive integer. In some embodiments, the range of ratings is normalized to a range of –1 to +1. One of ordinary skill in the art will recognize that the concepts described herein apply equally well to other ranges as well. It should be noted that the raters may submit ratings to the system using a different range (e.g., 1 to 5, or 0 to 5, or 1 to 10, etc.) than the normalized range of –1 to 1. In such embodiments, the rater-submitted ratings are mapped (e.g., rescaled and translated up or down) into the normalized range used by the reputation manager 114 (FIG. 1) to determine reputation values for the raters, or reviews, or both. For instance, ratings AA provided by raters using a rating range of 1 to 5, with 3 representing a neutral rating, may be mapped into normalized ratings BB by applying the function 0.5×(AA–3). The reputation values computed by the reputation manager 114 (FIG. 1), using the normalized rating values, are used to compute cumulative ratings for products, merchants or other rateables.

The forward link 214 from the first rater 202 to the first review 206 indicates that the first rater has provided a review with a positive rating of "1". Similarly, a pair of links 216 and 218 establishes a relationship between the first rater 202 and the second review 208. In this instance, however, the forward link 218 has a value of "–1" indicating a negative rating provided by the first rater 202 for the rateable which was the subject of the second review 208. The second rater 204 has provided a negative rating for the rateable which is the subject of the third review 210 (i.e., backward link 222 with a value of "1" and forward link 224 with a value of "–1"). Additionally, the first rater 202 has a forward link 220 to third review 210 with a value of "1" indicating the first rater's positive rating of the third review 210. The first rater's rating of the third review 210 may be considered to be a measure of the usefulness of the review to the first rater, although other interpretations of the rating may also apply in various contexts. The second rater 204 has a forward link 228 to second review 208 with a value of "1" indicating the first second rater's positive rating of the second review 208. The links 220 and 228 do not have corresponding backward links from the respective review to the respective rater because the reputation of the reviews does not flow to non-authoring raters. Any rater may provide a positive, neutral or negative rating for a review written by another rater. A negative rating indicates lack or usefulness (e.g., failure to provide useful or believable information), disbelief or distrust in the review written by the authoring rater, which will ultimately impact the reputation of the authoring rater.

According to some embodiments determining reputations involves examining the extrinsic relationships between the entities creating reviews, the reviews, and entities rating reviews. For example, the link structure of a directed graph of raters and reviews such as illustrated in FIG. 2 can be examined. A link-based ranking analysis is provided, for example, in U.S. Pat. No. 6,285,999 to Page. This patent discloses a technique, sometimes called the PageRank algorithm, used by the Google search engine for assigning a rank to each document in a hypertext database. According to the link-based ranking method of Page, the rank of a node is recursively defined as a function of the ranks of its parent nodes. Looked at another way, the rank of a node is the steady-state probability that an arbitrarily long random walk through the network will end up at the given node. Thus, a node will tend to have a high rank if it has many parents, or if its parents have high rank. Conversely, a node with few parents will tend to have low rank. In some embodiments of the PageRank algorithm, the lowest ranked document in a set of documents is assigned a rank of zero, while in other embodiments the lowest ranked document is assigned a rank that is a small positive value.

According to embodiments of the invention, novel extensions of the PageRank algorithm permit a link based analysis to determine steady-state reputations for nodes in a reputation graph. Reputations are distributed among raters and their reviews. Preferably, raters in the system who write reviews which are rated highly by a number of raters should have good reputations and raters who write reviews that are rated poorly by other raters should have poor reputations. However, spammers may attack the system in various ways. Some may flood the system in an attempt to increase their own reputations while others may attempt to lower the reputations of their competitors or enemies. One technique to address this concern provides for the reputation score of a rater who writes well rated reviews to also depend on the reputation of the raters who rated their reviews highly. Similarly, a rater who writes reviews that are poorly rated should not be penalized as much if the poor reviews come from raters with low reputation as if they come from those with strong reputations.

FIG. 3 illustrates a matrix 300 constructed from the directed graph in FIG. 2 to aid in determining reputation. A row 302 and column 304 are provided for each reviewer and each review. A value in position (i, j) indicates a link from node i to node j, with the value representing the rating value that node i provides for node j. For example, in position 306 a value of "−1" represents the link 218 (FIG. 2) from R1 (i.e., first reviewer 202 in FIG. 2) to r2 (i.e., second review 208 in FIG. 2) with a negatively valued rating of "−1". The link 216 (FIG. 2), in another example, is represented by position 308 (i.e., a positive rating link from the second review 208 to the first reviewer 202 in FIG. 2).

Figure 4:
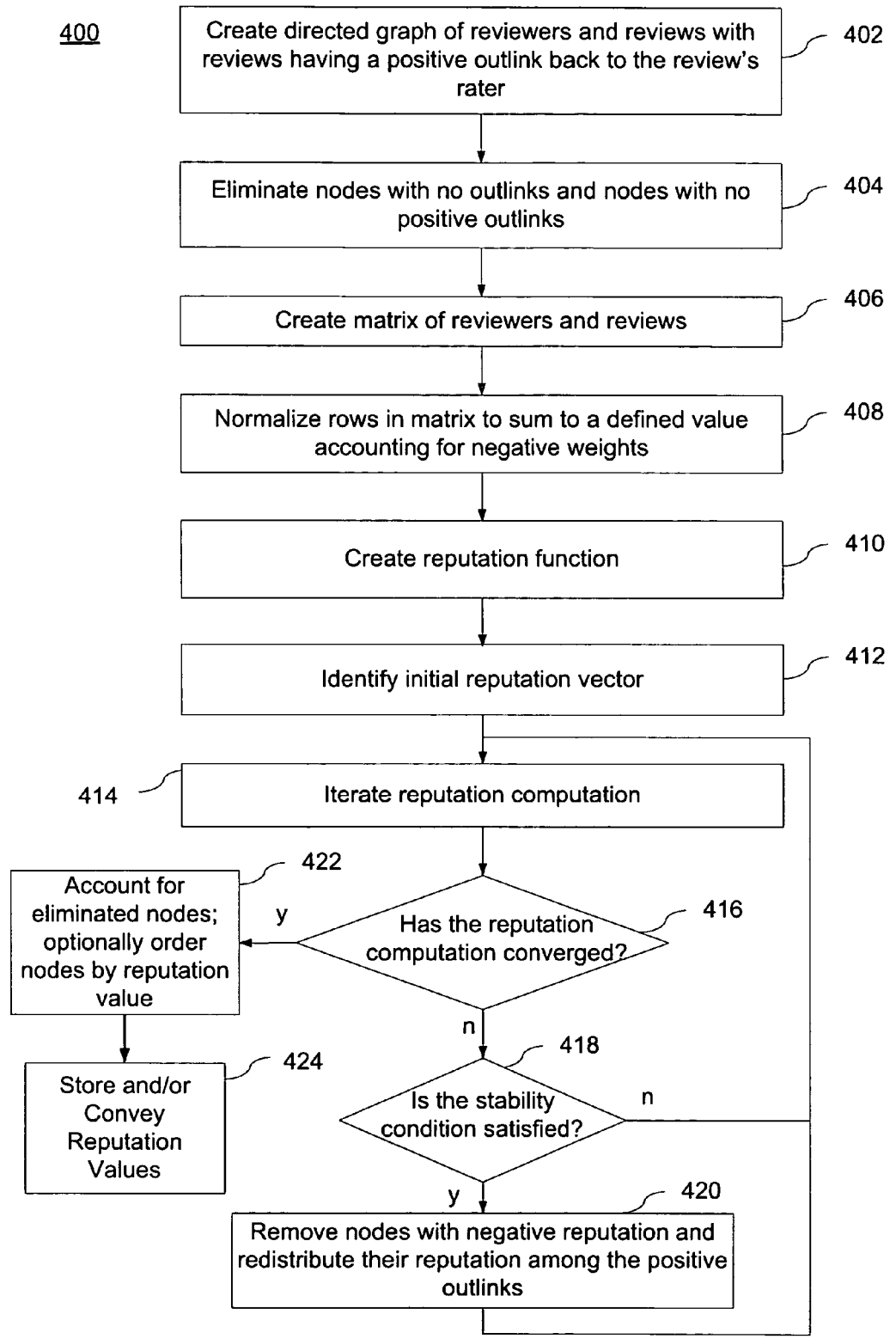
FIG. 4 is a flow diagram of a process for determining a set of reputation scores according to some embodiments of the invention.

FIG. 4 depicts an exemplary process 400 for determining a set of reputations in accordance with some embodiments of the invention. Initially a directed graph is created (402) which is similar in type to the directed graph depicted in FIG. 2. Each node of the graph represents either a rater or a review for a rateable. Each review that a rater wrote will be forward linked from the rater to the review, with the link having a weight equivalent to the rating (normalized, if necessary) the reviewer provided for that review. Each review has a link (sometimes called a backward link) from the review to the authoring rater with the link having a weight equivalent to a high rating (i.e., the review gives a high rating score to its author), though other ratings are envisioned. The higher the link weight (i.e., the rating back to the author) of the backward link, the more the review's "reputation" will contribute to the reputation of the authoring rater. Finally, forward links are made from a rater to a review that the rater rates with the link weight indicating the rater's opinion of the review. A more useful graph is created from this graph by eliminating those nodes which have no outlinks and nodes which provide no positive reviews (404). Nodes which have no outlinks are not reviews since every review will have an outlink to its author. And, if they are raters, then that rater is not providing any reviews or rating any reviews. Eliminating these nodes assists in reducing un-needed computations and potential sources of reputation "sinks" (i.e., nodes which receive reputation values from other nodes, but which to do not flow reputation to other nodes). Nodes which provide no positive links are eliminated primarily because they are incompatible with the reputation computation methodology used in the embodiments described here. From another vantage point, raters who give only negative and/or neutral reviews are automatically assigned such a low reputation that they have no significant impact on the reputation computation. From the resulting graph, a matrix A is created (406) where a value in the position (i, j) indicates a link from node i to node j. The value at position (i, j) is the rating weight on the link from node i to node j.

In order to account for potential variability in raters' ratings, a normalization process is applied. This also assists in preventing raters who assign very large or very low ratings in an attempt to subvert the reputation system (since each node's reputation depends on the reputations of the nodes which point to it). The rows in the matrix are normalized to a defined value, such as 1, and modified to take into account negative weights (408) to produce a matrix C. The normalization and accounting for negative weights is discussed in more detail below with reference to FIG. 5. It is worth noting that the PageRank algorithm does not take into account negative links or negative page ranks.

Each row in the resulting matrix C can be used to represent a distribution of the current reputation of the corresponding node to the nodes on the outlinks of the corresponding node, in proportion to the value of the normalized ratings provided by the rater on the outlinks. In a transpose of the matrix C, denoted $C^T$, each row represents the weights applied to the incoming current reputation values from each of the nodes in the row (i.e., those that point to the node corresponding to the row). When $C^T$ is multiplied by a one dimensional vector $r^{(0)}$ representing the initial reputation values of the nodes, the resulting vector $r^{(1)}$ represents the next reputation values of the nodes. In this way, a reputation function is created (410). Written more generally, a reputation function is provided as:

$$r_{(k+1)} = dC^T r_{(k)},$$

wherein $r_{(k+1)}$ is a one dimensional vector comprising the (k+1)st iteration of reputation values for the nodes in the matrix, d is a decay factor (e.g., 0.9), $C^T$ is the transpose of the matrix C, and $r_{(k)}$ is a one dimensional vector comprising the $k^{th}$ iteration reputation values. To begin the calculations, an initial reputation vector, $r_{(0)}$ must be identified (412). According to some embodiments, each node is given an initial reputation value of "1" though other vectors may be used (e.g., a previously computed reputation for a node).

An iteration of the reputation function is performed (414). After the iteration is complete, a convergence condition is examined (416). The reputation function is considered to have converged when an absolute difference, D, between the current reputation vector $r_{(k+1)}$ previous reputation vector $r_{(k)}$ is less than a predetermined convergence value, $$D = \frac{\sqrt{\sum (r_{k+1} - r_k)^2}}{\# \text{ nodes}} < \text{Convergence Value},$$

i.e., the square root of the sum of the squared differences. In an exemplary embodiment, the convergence value is 0.0005.

Once the absolute difference falls below the convergence value (416—yes), further iterations of the computation are not required. If, on the other hand, the absolute difference is not less than the predetermined value (416—no), then a stability condition is checked (418). In some embodiments, the stability condition is not satisfied when D is greater than a predetermined stability value S. When the stability condition is not satisfied (418—no) then the reputation values are changing relatively rapidly and the process returns to 414 for another computation of the reputation values. If on the other hand, the stability condition is satisfied (418—yes) (i.e., D is less than or equal to S), then some processing is applied to the reputation function. The predetermined stability value S is a number greater than the convergence value (e.g., S might be 0.5 when the convergence value is 0.001). In some embodiments, nodes with negative reputation values are removed from the reputation function and their reputation values are distributed among the remaining nodes (420). This helps to prevent the computation process from diverging instead of converging. As will be explained in more detail below, with reference to FIG. 6, the rows and columns for nodes with negative reputation are removed, and then the rows of the matrix are re-normalized, which effectively re-distributes the reputation of the removed nodes. Nodes with negative reputation values are removed because they tend to destabilize the reputation computation process, and furthermore because nodes with negative reputation values represent raters who are considered to be less desirable than raters represented by nodes with positive reputation values. Furthermore, removal of these nodes can reduce the computation time of the overall reputation function. In some embodiments, these removed nodes are assigned a final reputation of zero. In some embodiments, the stability condition is not checked after each iteration, but instead, after a number of iterations.

In some embodiments, when the reputation function converges (416—y) (i.e., D is less than or equal to the convergence factor) the cycle of iterations is complete. In some embodiments, the reputations may be read from the final reputation vector. In some embodiments, only nodes with positive reputations are ordered in accordance with their respective reputation. Nodes with negative or zero reputation are considered equivalent. Optionally, in some embodiments, the previously removed nodes are accounted for (422) in order to create a completed ordered ranking of nodes by reputation. Each previously removed node, n, is identified and its reputation value at the iteration in which it was removed is scaled to the present iteration (i.e., (k+1)). According to some embodiments, this scaling is done by multiplying the last iteration reputation value the node had at iteration i (i.e., $r(n)_{(i)}$) by d (the decay factor) raised to a power of the iteration cycle of the convergence (i.e., k+1) minus i, or expressed another way: $r(n)_{(k+1)} = r(n)_{(i)} d^{(k+1-i)}$, where the subscripts of "r(n)" indicate an iteration count, while the superscript of "d" represents exponentiation. For example, if a node had been removed at iteration 7 (i.e., $r_{(k+1)} = d\,C^T r_{(k)}$, where k=6) then at a convergence iteration of 10 (i.e., $r_{(k+1)} = d\,C^T r_{(k)}$, where k=9) the value of $r(n)_{(10)} = r(n)_{(7)} d^3$. Once all of the removed nodes have been scaled, the resulting set of reputation values are stored and/or conveyed to another computer or process that requires the reputation values (424). Optionally, the nodes associated with the reputation values may be ordered in accordance with their respective reputation value (422) prior to or after the storing or conveying operation (424). In some embodiments, nodes that had been removed during 420 are assigned a final reputation of zero. The complete ordered set of all nodes can be used, for example, to eliminate or reduce the impact of ratings by raters having negative reputations.

Figure 5:
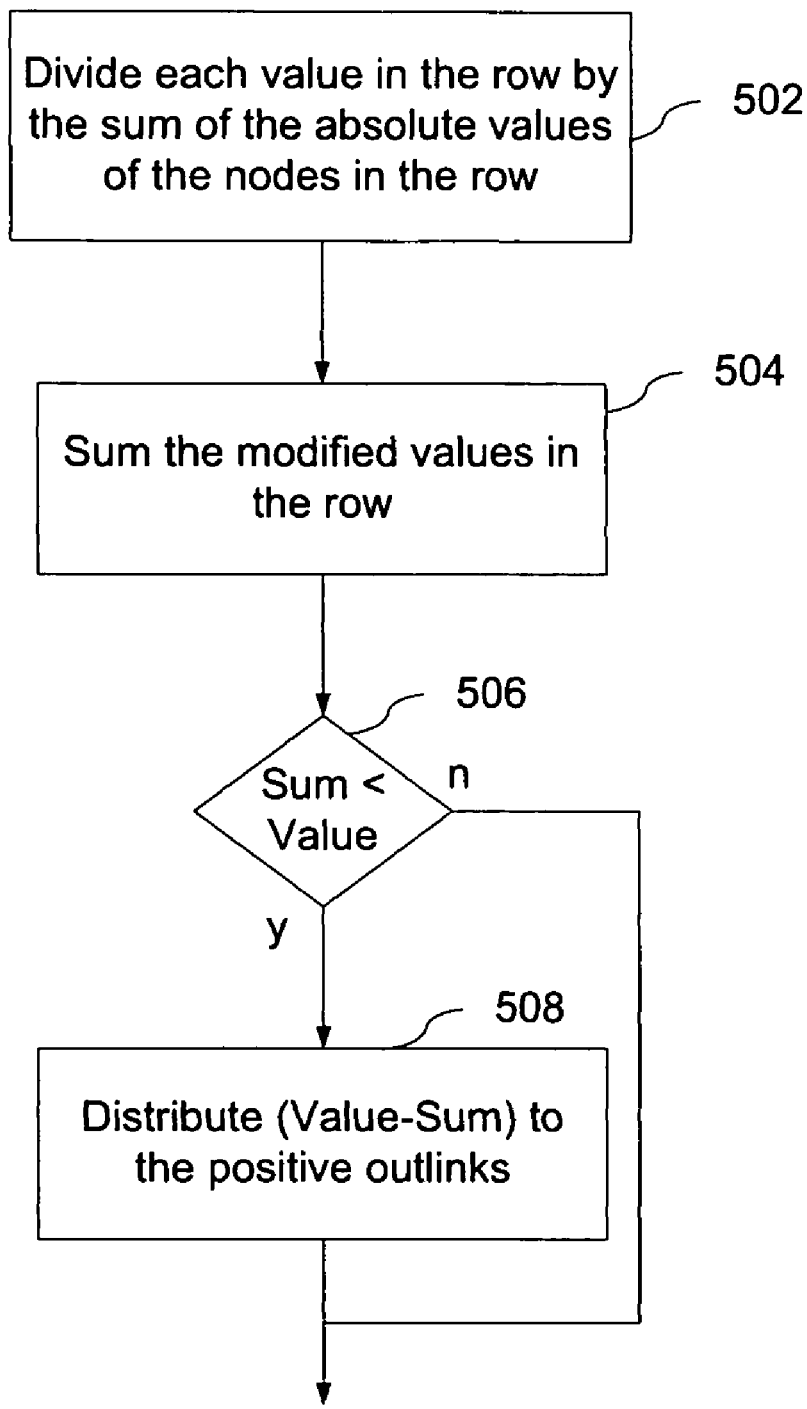
FIG. 5 is a flow diagram of a process for normalizing rows of a matrix according to some embodiments of the invention.

FIG. 5 depicts a process 500 for normalizing a row according to some embodiments. Each value in a row is divided by the sum of the absolute values of all the nodes in the row (502) (e.g., in row R1 of matrix 300 in FIG. 3 the values would be divided by 3). The resulting values are then added together (504) (e.g., the row R1 302 in FIG. 3 would yield a value of ⅓−⅓+⅓=⅓). This sum is then compared (506) to a predefined value, V. In some embodiments, this value is "1" to improve convergence. If the sum is greater than or equal to the value (506—yes) then the row has been normalized. If however, the sum is less than the value (506—no) (e.g., the row R1 had a value of ⅓ when V is 1), then a value D1, equal to V minus the sum of the node values, is distributed on the positive links (508) (e.g., D1=V−⅓=⅔, when V is 1). In some embodiments, D1 is equally distributed (i.e., by adding) among the positively valued links. For example, the row R1 would be finally normalized to [0 0 ⅔−⅓ ⅔], which, when summed equals the value V, here 1. In other embodiments, a random distribution or a distribution that is proportional to the current reputation values may be used.

Figure 6:
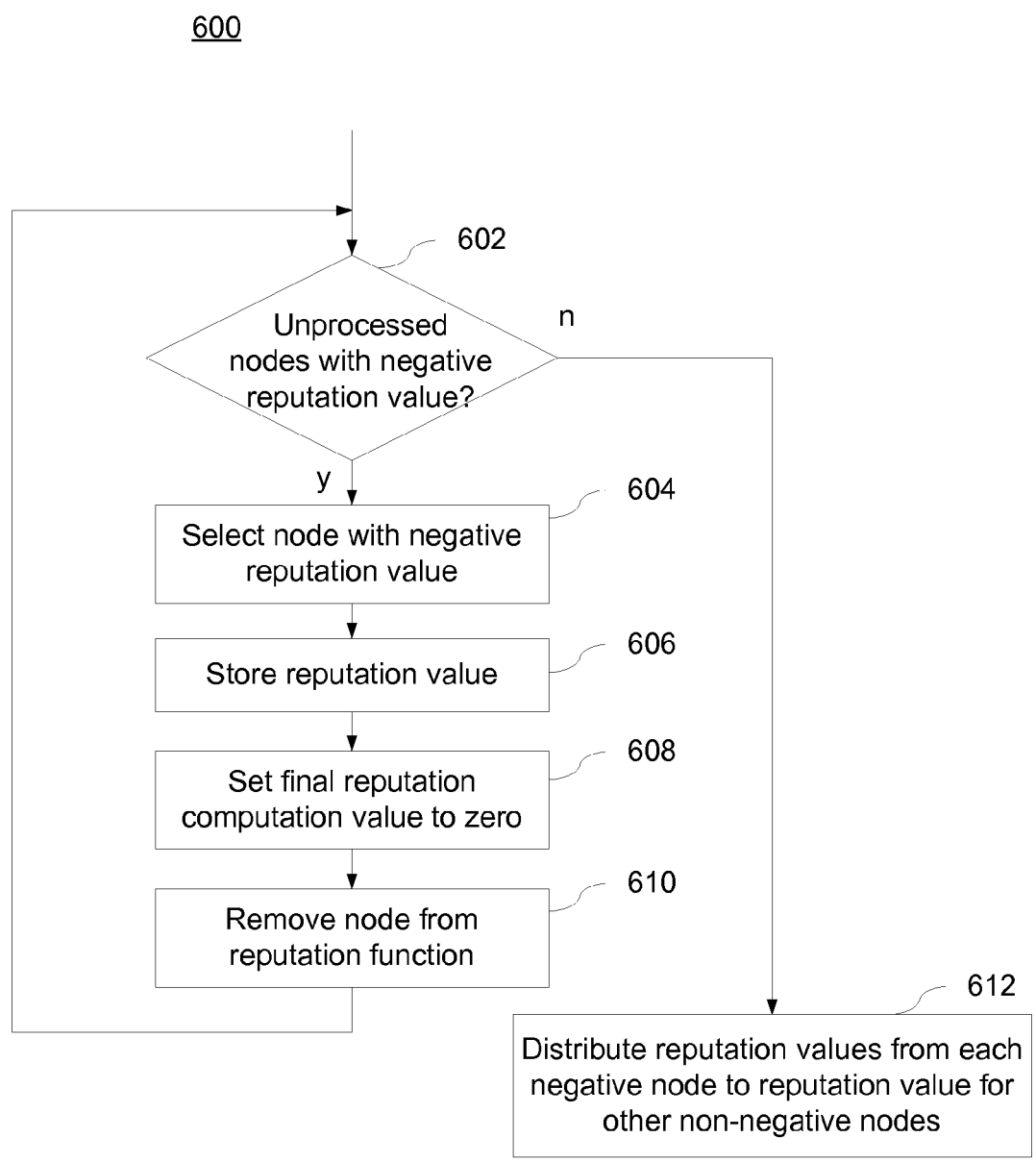
FIG. 6 is a flow diagram of a process for modifying the reputation function in light of nodes with negative reputations according to some embodiments of the invention.

FIG. 6 depicts a process 600 for processing nodes having negative reputation values when the stability condition has been reached according to some embodiments of the invention. If there are negative nodes which have not yet been processed (602—yes), then one of the unprocessed nodes is selected which has a negative reputation value (604). The selected node's reputation value, along with the iteration value is stored (606) for later use in determining the complete set of ordered reputations as discussed more fully above. The final reputation value of this node is set to zero in some embodiments of the invention (608). As noted above, in other embodiments the negative reputation value of the selected node is retained and later used to determine a final reputation value. The selected node is removed from the reputation function (610). Removing the node from the reputation function includes removing the row and column associated with the node from the matrix and removing the node's reputation value from the reputation vector. Once all of the negatively valued reputation nodes have been processed (602—no), the reputation values from each of the removed nodes is distributed (612) among the remaining nodes in the reputation vector, so as to keep the total of the reputation values in the reputation function unchanged. In other words, the total value of the nodes with negative reputation is distributed to the remaining nodes (neutral reputation nodes, such as those with a value of 0, remain in the reputation vector). The total value of the removed nodes may be distributed (i.e., added) to the remaining nodes in any of a number of ways (e.g., equally, randomly, pro rata share, to the nearest neighbors in the directed graph still remaining). However, to avoid the adjusted value of any remaining node becoming negative, the amount that is "added" to any node is limited so as to not reduce the value of the node below a predefined minimum value (e.g., 0, or a small positive seed value). In some alternate embodiments, if any nodes have negative value after performing the redistribution operation (612), then the process 600 is repeated so as to redistribute the values of those nodes.

Once the final reputations for raters and reviews have been calculated, cumulative ratings for various rateables may be determined by a reputation-weighted sum of the ratings for that rateable. For example, consider a product X having three reviews r1, r2, and r3, attributed to raters R1, R2, and R3, respectively. The cumulative rating for this product X is the reputation of R1 multiplied by its rating associated with r1, added to the reputation of R2 multiplied by its rating associated with r2, added to the reputation of R3 multiplied by its rating associated with r3. The resulting sum is then divided the number of ratings so as to normalize the cumulative rating. More generally, a cumulative rating for a rateable may be written as:

$$CR = \frac{1}{n}\sum_{i=1}^{n} r_i R_i,$$

where CR is the cumulative rating for a particular rateable, n is the number of reviews for the rateable, $r_i$ is rating associated with the $i^{th}$ review of the rateable, and $R_i$ is the reputation of the review attributed to $r_i$. Note that any rating may have a negative value. As mentioned previously, raters and rateables can be various types of entities. For example, a rateable may be a product and the cumulative rating of that product is a linear combination of the reviews of that product as just described. A rateable may be a merchant and/or an advertiser. In some embodiments, ratings from raters with low reputation scores are ignored to combat spam.

In some embodiments, a rating may be computed for sets of rateables associated with a group (e.g., products associated with a merchant, categories, market segments or products and/or merchants). According to some embodiments, an average of the cumulative averages of rating of the rateables is calculated. According to other embodiments, a secondary network is created and solved using the methods described above. For example, if, after computing the average ratings for products, information about which products are produced by particular manufacturers is available, an aggregate rating for a manufacturer can be computed. This approach also extends to more hierarchical examples. Consider the case where a company has a number of different product lines. If ratings for individual products are available they can be aggregated to the product line level as well as to the manufacturer level. This may allow shoppers to draw conclusions about the likely rating of a new product from a certain manufacturer or from a certain product line of a manufacturer. The preceding examples may use weighted averages to generate aggregated ratings. If raters are allowed to rate product lines or manufacturers (or product categories or other groupings), however, then the reputation computation process described above may be applied to these types of ratings as well.

Figure 7:
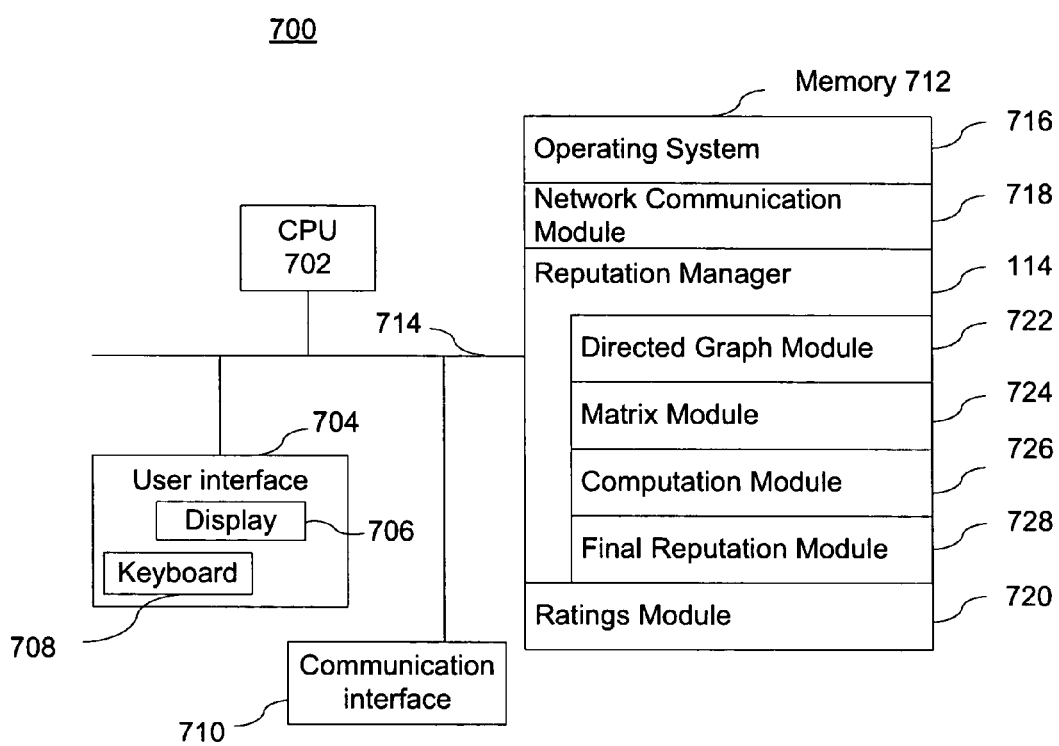
FIG. 7 is a computer system suitable for implementing embodiments of the invention.

FIG. 7 is a block diagram of a reputation server 700. The reputation server 700 generally includes one or more processing units (CPU's) 702, one or more network or other communications interfaces 710, memory 712, and one or more communication buses 714 for interconnecting these components. The reputation server 700 may optionally include a user interface 704, for instance a display 706 and a keyboard 708. Memory 712 may include high speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 712 may optionally include one or more storage devices remotely located from the CPU(s) 702. In some embodiments, memory 712 stores the following programs, modules and data structures, or a subset thereof:

- an operating system 716 that includes procedures for handling various basic system services and for performing hardware dependent tasks;
- a network communication module 718 that is used for connecting the reputation server 700 to other computers via the one or more communication network interfaces 710 (wired or wireless), such as the Internet, other wide area networks, local area networks, metropolitan area networks, and so on;
- a reputation manager module 114 (or instructions) that takes a set of raters and reviews written for rateables and determines a set of reputations; and
- a ratings module 720 that determines ratings for various rateables based on reviews of the rateable and the rater's reputation.

The reputation manager 114 may include a directed graph module 722 for creating a directed graph of raters and reviews as discussed above, a matrix module 724 for creating a matrix from the directed graph, a computation module 726 for performing computations on the matrix, and a final reputation module 728 for determining an ordered set of reputations.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 712 may store a subset of the modules and data structures identified above. Furthermore, memory 712 may store additional modules and data structures not described above.

Although FIG. 7 shows a "reputation server," FIG. 7 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers used to implement an reputation server and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for determining reputation values comprising:
on a server system having one or more processors and memory storing one or more programs for execution by the one or more processors, performing the steps comprising:
  until a convergence condition is satisfied:
    iteratively solving a reputation function for a set of reputation values with respect to a set of linked nodes, the nodes including first nodes representing reviewers and second nodes representing reviews, wherein at each iteration, the reputation values of the reviewers are updated in accordance with reputation values of one or more of the reviews and the reputation values of the reviews are updated in accordance with reputation values of one or more of the reviewers;
    determining whether a stability condition is satisfied, wherein the stability condition is satisfied when an absolute difference between a current value of the set of reputation values and a previous value of the set of reputation values is less than a predetermined convergence value;
    modifying the reputation function so as to remove from the reputation function portions of the reputation function corresponding to nodes with negative reputation when the stability condition is satisfied; and
  generating reputation values for at least the reviewers and reviews corresponding to nodes that have not been removed from the reputation function.

2. The method of claim 1, wherein prior to solving a first iteration of the reputation function:
  excluding from the reputation function nodes having no outlinks; and
  excluding from the reputation function nodes having no positively valued outlinks.

3. The method of claim 2, wherein prior to solving the first iteration of the reputation function but subsequent to excluding from the reputation function nodes having no outlinks and excluding from the reputation function nodes having no positively valued outlinks:

normalizing respective outlinks for a node to sum to a predefined value.

4. The method of claim 3, wherein the normalizing includes:
normalizing the respective node outlinks by dividing each respective node outlink value by a value corresponding to a sum of the respective node outlink values; and
creating modified node outlink values when the sum of the normalized node outlink values does not sum to the predefined value by distributing a value corresponding to (1−the sum of the normalized node outlink values) among the positively valued normalized node outlink values.

5. The method of claim 1, wherein modifying the reputation function includes:
removing nodes having a respective current iteration reputation value less than zero.

6. The method of claim 5, wherein removing nodes having the respective current iteration reputation value less than zero is performed when the stability condition is satisfied.

7. The method of claim 5, wherein subsequent to the removing, modifying the reputation function to distribute the respective current iteration value corresponding to each removed node among a remaining set of reputation values.

8. The method of claim 7, further including:
identifying a set of nodes removed because their respective current iteration reputation values were less than zero; and
modifying each respective current iteration reputation value in the set based on a decay factor of the reputation ranking function and an iteration value during which the respective node in the set was removed.

9. A computer program product for use in conjunction with a computer system, the computer program product comprising a computer readable storage medium and a computer program mechanism embedded therein, the computer program mechanism comprising:
instructions for repeatedly performing a set operations, until a convergence condition is satisfied, the set of operations comprising:
solving an iteration of a reputation function for a set of reputation values with respect to a set of linked nodes, the nodes including first nodes representing reviewers and second nodes representing reviews, wherein at each iteration, the reputation values of the reviewers are updated in accordance with reputation values of one or more of the reviews and the reputation values of the reviews are updated in accordance with reputation values of one or more of the reviewers;
determining whether a stability condition is satisfied, wherein the stability condition is satisfied when an absolute difference between a current value of the set of reputation values and a previous value of the set of reputation values is less than a predetermined convergence value;
modifying the reputation function so as to remove from the reputation function portions of the reputation function corresponding to nodes with negative reputation when the stability condition is satisfied; and
generating reputation values for at least the reviewers and reviews corresponding to nodes that have not been removed from the reputation function.

10. The computer program product of claim 9, further including instructions for, prior to solving a first iteration of the reputation function:
excluding from the reputation function nodes having no outlinks; and
excluding from the reputation function nodes having no positively valued outlinks.

11. The computer program product of claim 10, further including instructions for, prior to solving the first iteration of the reputation function but subsequent to excluding from the reputation function nodes having no outlinks and excluding from the reputation function nodes having no positively valued outlinks:
normalizing respective outlinks for a node to sum to a predefined value.

12. The computer program product of claim 11, wherein the instructions for normalizing include:
instructions for normalizing the respective node outlinks by dividing each respective node outlink value by a value corresponding to a sum of the respective node outlink values; and
instructions for creating modified node outlink values when the sum of the normalized node outlink values does not sum to the predefined value by distributing a value corresponding to (1−the sum of the normalized node outlink values) among the positively valued normalized node outlink values.

13. The computer program product of claim 9, wherein the instructions for modifying the reputation function include:
instructions for removing nodes having a respective current iteration reputation value less than zero.

14. The computer program product of claim 13, further including instructions for, subsequent to the removing, modifying the reputation function to distribute the respective current iteration value corresponding to each removed node among a remaining set of reputation values.

15. The computer program product of claim 14, further including instructions for:
identifying a set of nodes removed because their respective current iteration reputation values were less than zero; and
modifying each respective current iteration reputation value in the set based on a decay factor of the reputation ranking function and an iteration value during which the respect node in the set was removed.

16. A computer, comprising:
memory;
one or more processors; and
at least one program, stored in the memory and executed by the one or more processors, the at least one program including:
instructions for iteratively solving a reputation function for a set of reputation values with respect to a set of linked nodes, the nodes including first nodes representing reviewers and second nodes representing reviews, wherein at each iteration, the reputation values of the reviewers are updated in accordance with reputation values of one or more of the reviews and the reputation values of the reviews are updated in accordance with reputation values of one or more of the reviewers;
instructions for determining whether a stability condition is satisfied, wherein the stability condition is satisfied when an absolute difference between a current value of the set of reputation values and a previous value of the set of reputation values is less than a predetermined convergence value;
instructions modifying the reputation function so as to remove from the reputation function portions of the reputation function corresponding to nodes with negative reputation when the stability condition is satisfied; and instructions for generating reputation values for at least the reviewers and reviews corresponding to nodes that have not been removed from the reputation function.

17. The computer of claim 16, wherein the program further includes instructions for, prior to solving a first iteration of the reputation function:
   excluding from the reputation function nodes having no outlinks; and
   excluding from the reputation function nodes having no positively valued outlinks.

18. The computer of claim 17, wherein the program further includes instructions for, prior to solving the first iteration of the reputation function but subsequent to excluding from the reputation function nodes having no outlinks and excluding from the reputation function nodes having no positively valued outlinks:
   normalizing respective outlinks for a node to sum to a predefined value.

19. The computer of claim 18, wherein the instructions for normalizing includes instructions for:
   normalizing the respective node outlinks by dividing each respective node outlink value by a value corresponding to a sum of the respective node outlink values; and
   creating modified node outlink values when the sum of the normalized node outlink values does not sum to the predefined value by distributing a value corresponding to (1−the sum of the normalized node outlink values) among the positively valued normalized node outlink values.

20. The computer of claim 16, wherein the instructions for modifying the reputation function includes instructions for removing nodes having a respective current iteration reputation value less than zero.

21. The computer of claim 20, wherein the program further includes instructions for, subsequent to the removing, modifying the reputation function to distribute the respective current iteration value corresponding to each removed node among a remaining set of reputation values.

22. The computer of claim 21, wherein the program further includes instructions for:
   identifying a set of nodes removed because their respective current iteration reputation values were less than zero; and
   modifying each respective current iteration reputation value in the set based on a decay factor of the reputation ranking function and an iteration value during which the respect node in the set was removed.

23. The method of claim 1, wherein
   iteratively solving a reputation function comprises iteratively solving the reputation function for a vector of reputation values with respect to a matrix of linked nodes, the nodes including first nodes representing reviewers and second nodes representing reviews, wherein at each iteration, the matrix is multiplied by the vector such that the reputation values of the reviewers are updated in accordance with reputation values of one or more of the reviews and the reputation values of the reviews are updated in accordance with reputation values of one or more of the reviewers; and
   modifying the reputation function comprises modifying the reputation function so as to remove from the matrix nodes with negative reputation when the stability condition is satisfied.

24. The computer program product of claim 9, wherein
   solving an iteration of a reputation function comprises solving an iteration of a reputation function for a vector of reputation values with respect to a matrix of linked nodes, the nodes including first nodes representing reviewers and second nodes representing reviews, wherein at each iteration, the matrix is multiplied by the vector such that the reputation values of the reviewers are updated in accordance with reputation values of one or more of the reviews and the reputation values of the reviews are updated in accordance with reputation values of one or more of the reviewers; and
   modifying the reputation function comprises modifying the reputation function so as to remove from the matrix nodes with negative reputation when the stability condition is satisfied.

25. The computer of claim 16, wherein
   the instructions for iteratively solving a reputation function comprise instructions for iteratively solving a reputation function for a vector of reputation values with respect to a matrix of linked nodes, the nodes including first nodes representing reviewers and second nodes representing reviews, wherein at each iteration, the matrix is multiplied by the vector such that the reputation values of the reviewers are updated in accordance with reputation values of one or more of the reviews and the reputation values of the reviews are updated in accordance with reputation values of one or more of the reviewers; and
   the instructions modifying the reputation function comprise instructions modifying the reputation function so as to remove from the matrix nodes with negative reputation when the stability condition is satisfied.

* * * * *